United States Patent [19]
Dodd

[11] Patent Number: 4,557,015
[45] Date of Patent: Dec. 10, 1985

[54] POULTRY HALVING MACHINE

[76] Inventor: Thurston Dodd, Rte. 2, Lula, Ga. 30554

[21] Appl. No.: 539,705

[22] Filed: Oct. 6, 1983

[51] Int. Cl.$^4$ ............................................ A22C 21/00
[52] U.S. Cl. ........................................................ 17/11
[58] Field of Search ...................................... 17/11, 52

[56] References Cited

U.S. PATENT DOCUMENTS

| | | | |
|---|---|---|---|
| 3,490,092 | 1/1970 | Harrison | 17/11 |
| 4,251,901 | 2/1981 | Thomas et al. | 17/11 X |
| 4,406,037 | 9/1983 | Hazenbroek | 17/11 |

Primary Examiner—Willie G. Abercrombie
Attorney, Agent, or Firm—William H. Needle

[57] ABSTRACT

Birds transported by an overhead poultry shackle line suspended by their hocks are led into engagement with bird orientation devices moving with a horizontal endless conveyor element below and parallel to the path of movement of the overhead shackle line. The orientation devices, which are under influence of an endless camming mechanism, engage the birds through openings between their legs and pull the birds to positions of stability under tension as the birds are transported through a relatively stationary severing blade along their path of movement to achieve clean halving of each bird in succession across the backbone between the breast and hind quarters. The machine is adjustable to process birds of varying sizes.

6 Claims, 8 Drawing Figures

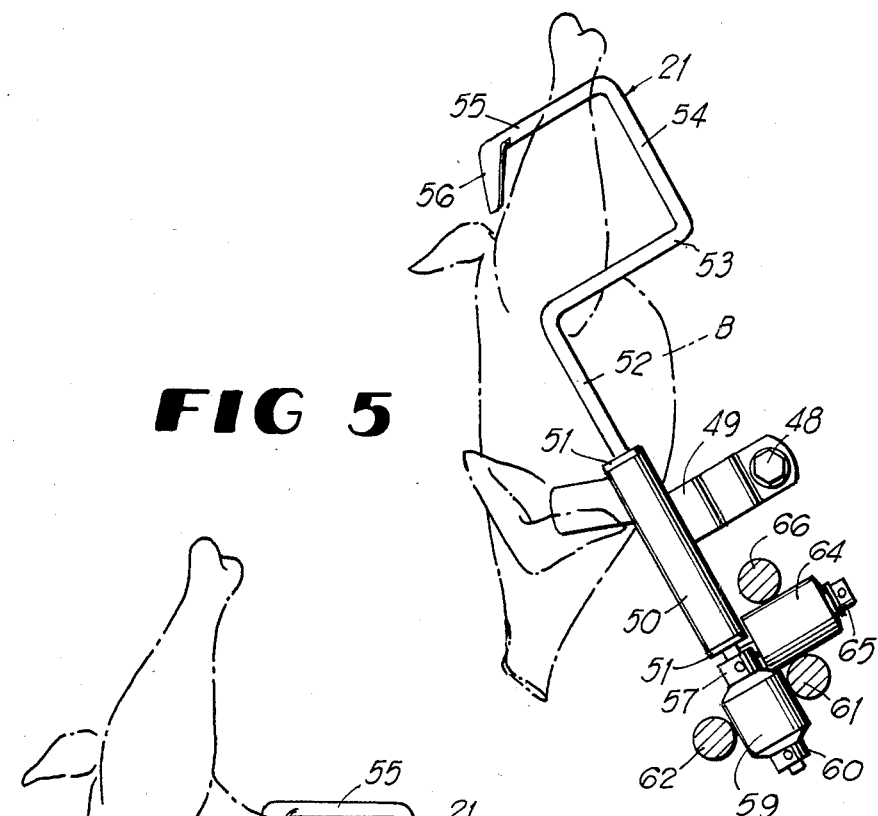
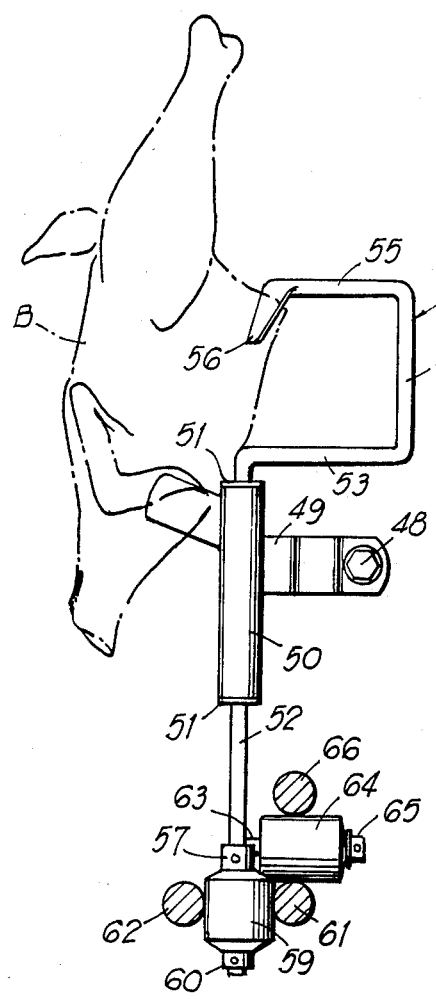
FIG 5
FIG 6

POULTRY HALVING MACHINE

BACKGROUND OF THE INVENTION

The objective of the present invention is to provide a simpler, more efficient and more practical machine for halving eviscerated poultry with uniformity on a high production basis. A further objective is to provide a poultry halving machine which can process birds of various sizes through a system of simple adjustments of key machine components.

Still another object of the invention is to provide an improved bird orientation and holding device, together with simplified endless camming means for the orientation device as it moves on an endless path in a horizontal plane with the conveyor element of the machine.

Another object and feature of the invention resides in the provision of a relatively stationary adjustable angled elongated bird severing blade which progressively cuts through each bird to halve the same while the bird is being transported with the movable orientation device through the halving zone where the blade is situated.

Other features and advantages of the invention will become apparent to those skilled in the art during the course of the following detailed description.

BRIEF DESCRIPTION OF THE DRAWINGS

FIG. 5 is a side elevational view, partly in cross section, of a bird orientation device positioned to initially engage a bird.

FIG. 6 is a similar view of the orientation device in a further position of engagement with the bird.

DETAILED DESCRIPTION

Figure 1:
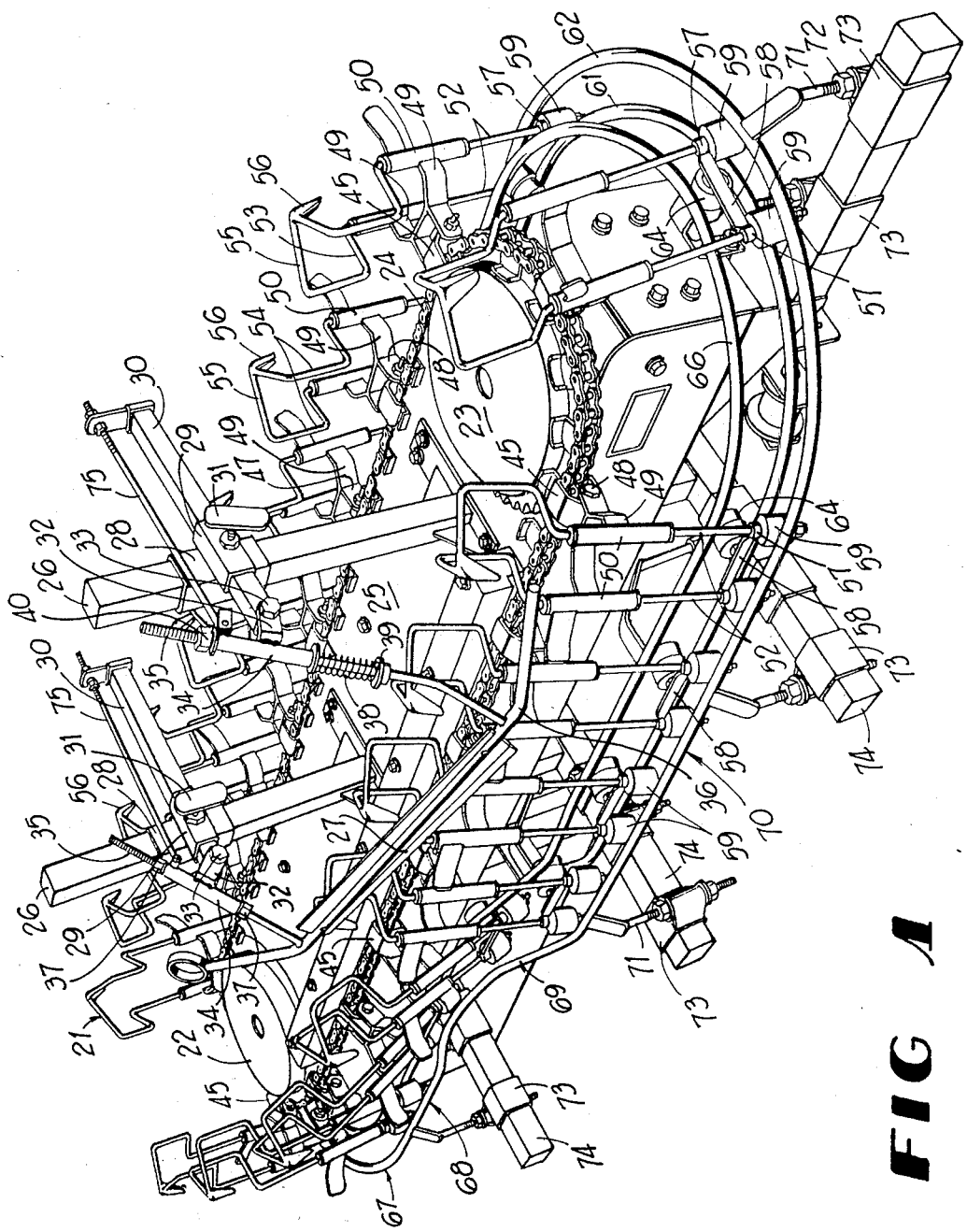
FIG. 1 is a perspective view of a poultry halving machine according to the present invention.
Figure 2:
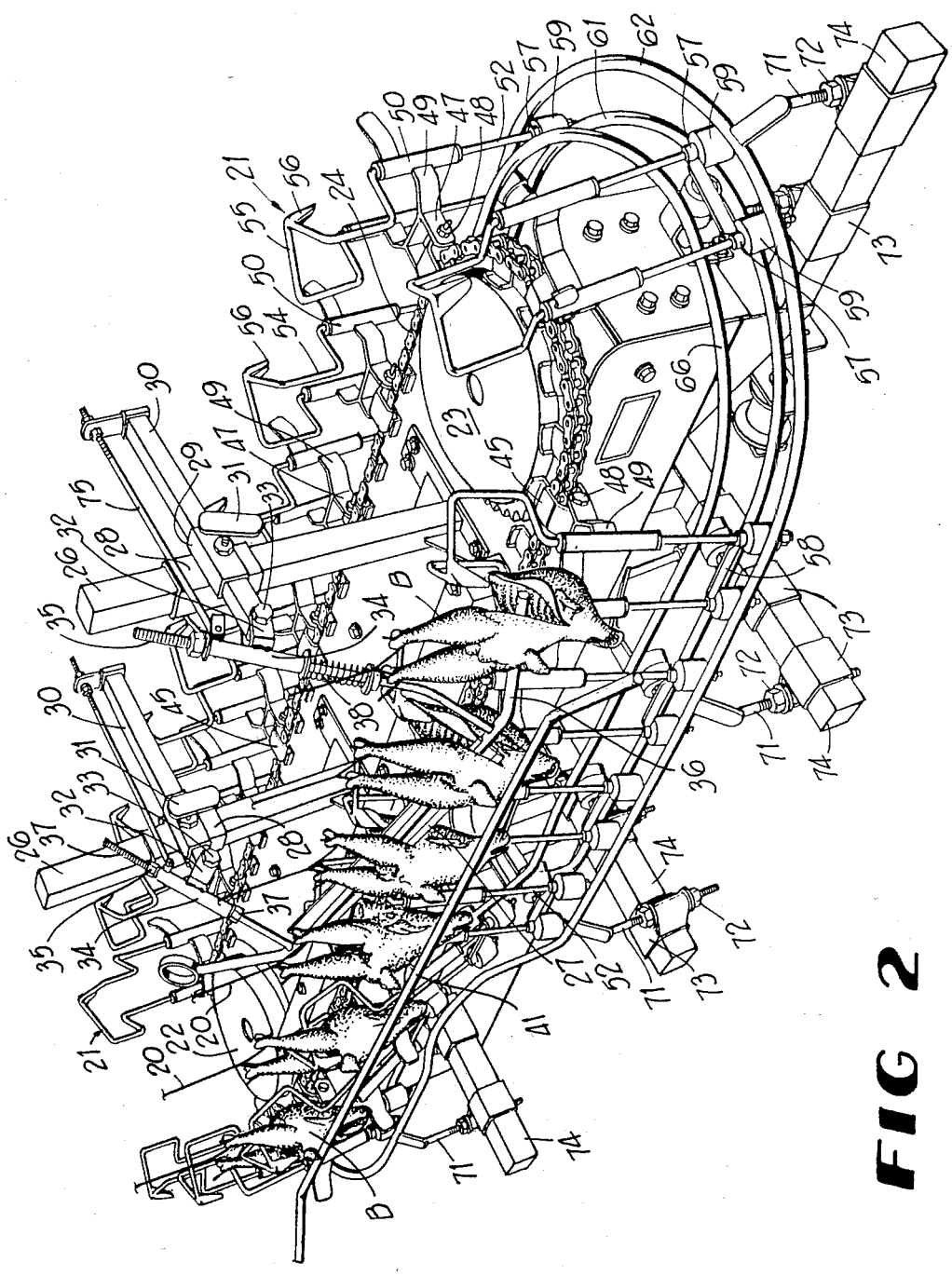
FIG. 2 is a similar view of the machine showing poultry units undergoing halving as they move through the machine.
Figure 3:
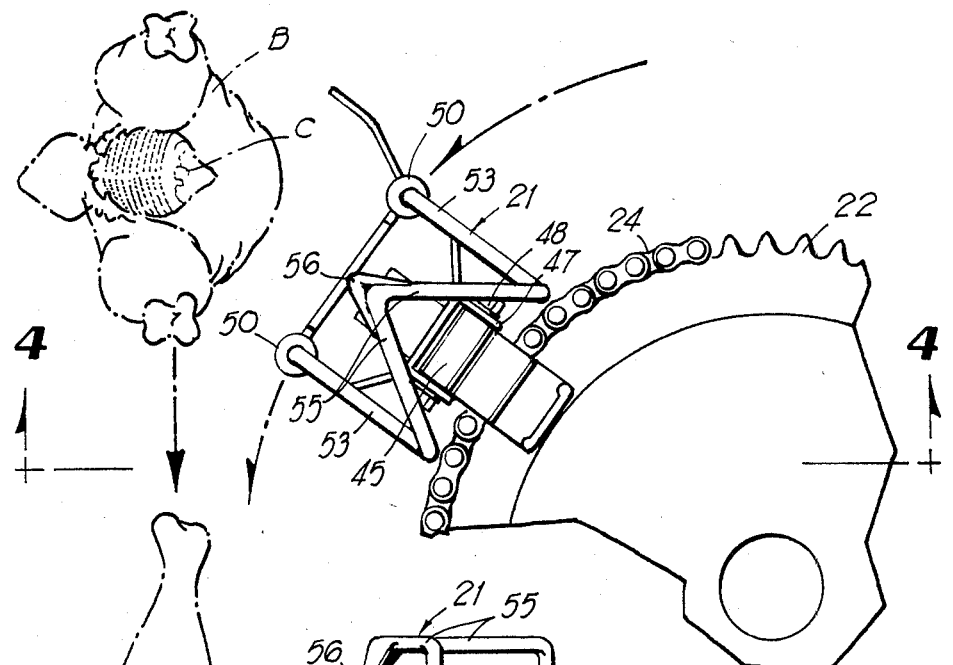
FIG. 3 is an enlarged fragmentary plan view of one end portion of the machine depicting the movement of one bird orientation device with relation to a bird being conveyed tangentially toward the orientation device by an overhead shackle line.
Figure 4:
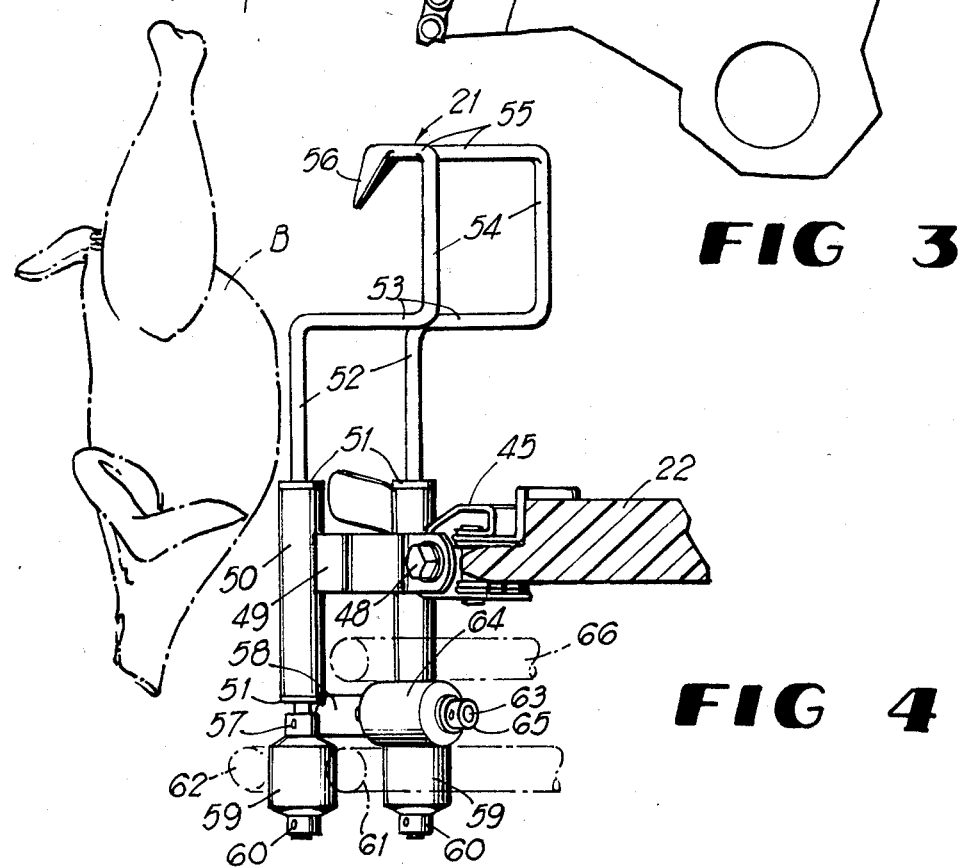
FIG. 4 is a vertical section taken on line 4—4 of FIG. 3.

Referring to the drawings in detail wherein like numerals designate like parts, a poultry halving machine shown in its entirety in FIGS. 1 and 2 is horizontally disposed below and parallel to an overhead shackle line, not shown, whose spaced shackles 20 carry birds B suspended heads down by their hocks. The birds, prior to entering the halving machine, have been eviscerated and have body cavity openings C, FIG. 3, between their legs. As best shown in FIGS. 3 and 4, each bird in succession is conveyed by the overhead shackle line substantially tangentially toward a bird orientation and holding device 21, as the latter travels around the periphery of a vertical axis sprocket gear 22 at the upstream end of the halving machine. The device 21 comprises a key element of the invention, together with endless camming means to regulate its positioning during the poultry halving operation, as will be completely described hereinafter.

The machine further comprises a downstream vertical axis sprocket gear 23, one of the two sprocket gears being power driven by a conventional power take-off shaft from the overhead shackle line, not shown. The sprocket gears 22 and 23 are engaged by an endless horizontal conveyor chain 24 which follows a horizontal frame plate 25 extending between the sprocket gears 22 and 23 and acting as a guide for the chain 24.

The plate 25 also serves to mount a pair of uprights 26 which serve as supports for an elongated angled poultry halving or severing knife blade 27 held in the path of movement of the birds as the latter travel with the chain 24.

The uprights 26 are fitted with vertically adjustable sleeves 28, locked by set screws, not shown. Welded at right angles to the vertical axis sleeves 28 are horizontal axis sleeves 29 which receive horizontally adjustable blade holding arms 30, lockable relative to the sleeves 29 by set screws 31.

At their forward ends, the arms 30 have yokes 32 pivoted thereto by bolts 33. Each yoke 32 is welded to a down tube 34 through which extends adjustably a screw-threaded shaft 35. The lower ends of screw-threaded shafts 35 are fixed to an elongated blade holding bar 36 to which the blade 27 is firmly anchored along its length.

The upstream threaded shaft 35 is fixedly held in the down tube 34 by lock nuts 37, whereas the downstream shaft 35 is biased downwardly by a coil spring 38 surrounding the shaft and bearing against a fixed washer 39 thereon. An upper adjusting nut 40 on the downstream shaft 35 regulates the elevation of the downstream spring-loaded end of the blade 27. This particular yielding mounting of the blade 27 enables the efficient halving of birds ranging in size from large to small.

Figure 7:
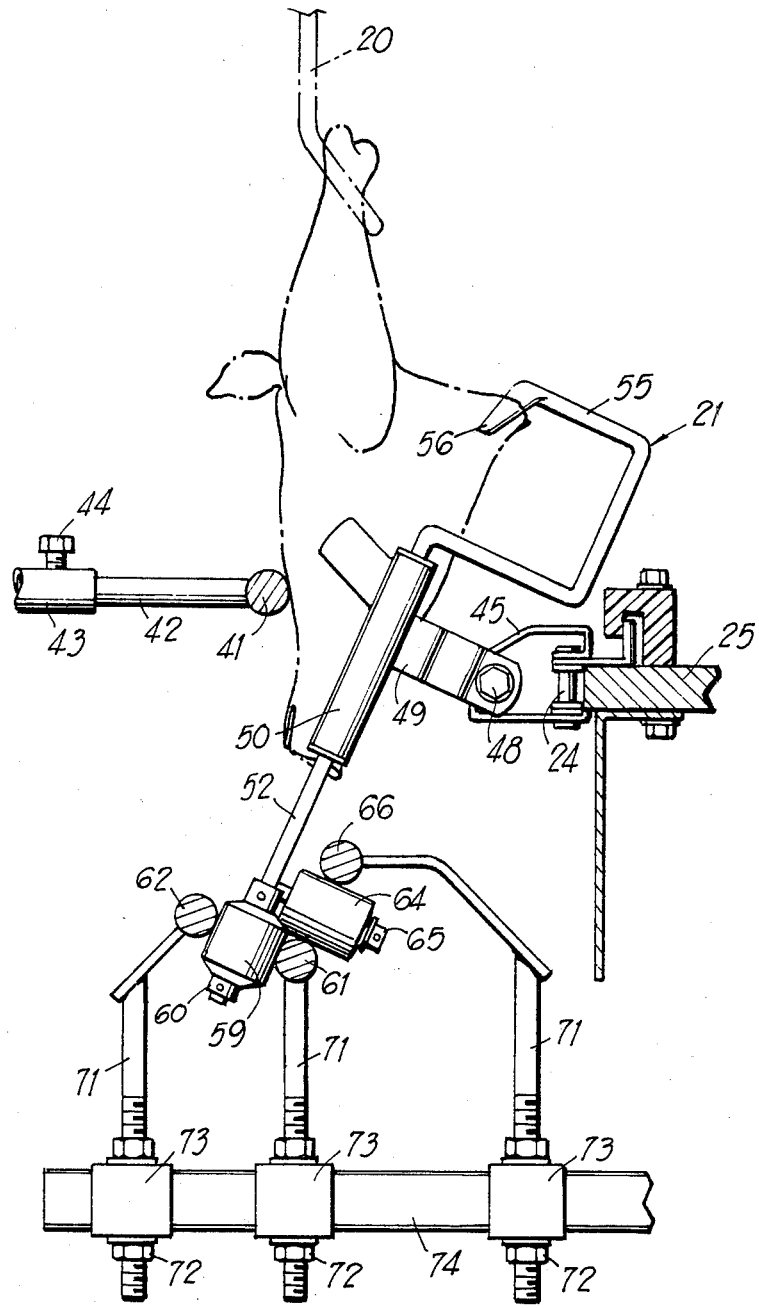
FIG. 7 is another view similar to FIGS. 5 and 6 showing the orientation device in a final position of engagement with the bird preparatory to severing the bird.

Referring to FIGS. 2 and 7, a bird back engaging bar 41 is preferably provided to firmly stabilize each bird B during its passage across the halving blade 27. The bar 41 is not absolutely essential and may be omitted in some cases. The bar 41 is carried by an arm 42 held in a tube 43 adjustably, and locked therein by a set screw 44. The supporting tube 33 may be fixed to the frame of the halving machine, or may form part of a separate and independent support near one side of the halving machine.

Referring again to the bird orientation and holding device 21, it may be seen that the chain 24 is equipped at spaced intervals with brackets 45 having collars 46 embraced by yokes 47 which are pivotally held by bolts 48. Each yoke 47 is welded through its arms 49 to a pair of slide tubes 50. The slide tubes 50 are equipped with upper and lower guides 51 formed of dry lube material, such as teflon. These guides receive pairs of slide rods 52 therethrough which are parts of each device 21. At their upper ends, the slide rods 52 are bent to form horizontal extensions 53, leading to vertical extensions 54. The tops of the vertical extensions 54 carry additional right angular extensions 55 which converge to a point where they are joined with a short dependent somewhat V-shaped bird engaging tang 56. The tang 56 is adapted to enter the body cavity opening C of the bird B to orient, hold and tension the bird as it passes the severing blade 27 to be halved thereby.

Collars 57 are fixed on the slide rods 52 near their lower ends and are interconnected by a crossbar 58 for the sake of rigidity. A pair of preferably nylon cam rollers 59 is journaled on the lower end portions of slide rods 52 and held thereon by additional collars 60. These cam rollers 59 are embraced interiorly and exteriorly by a pair of endless camming rods 61 and 62. Each crossbar 58 carries an axle 63, FIG. 4, extending from the interior side thereof, on which axle is journaled a preferably nylon cam roller 64, secured by a collar 65. The cam roller 65 is embraced above and below by endless camming rods 66 and 61, the same rod 61 acting on the interior sides of the paired rollers 59. The camming rods 61, 62 and 66 act in unison on the cam rollers 59 to pivot the orientation devices 21 about the axes of the bolts 48, thereby raising and lowering the depending tang 56 relative to the bird body cavity opening C.

Simultaneously, cam follower rollers 64 are being continuously acted upon by camming rods 61 and 66 to elevate and lower the slide rods 52 within the tubes 50. The combined action of the three camming rods upon the three rollers 59 and 64 of each device 21 produces proper orientation, positioning and tensioning of each bird B as it travels across the severing blade 27 to be halved thereby.

Referring to FIGS. 1 and 4, the three camming rods 61, 62 and 66 are shaped approximately at the location 67 to first hold each device 21 substantially vertically for ready acceptance of an oncoming bird B, FIG. 4. At the location 68, FIG. 1, the camming rods are shaped to act on the device 21 to elevate the tang 56 and swing it outwardly over the body cavity opening C, as shown in FIG. 5. At approximately the location 69, the three camming rods are further shaped to draw the tang 56 down into the bird opening C, as shown in FIG. 6, while simultaneously stretching the breast portion of the bird inwardly and away from the back and legs by pivoting around the axis of bolt 48. The slide rods 52 reciprocate through their guides 51 to enable these movements.

Figure 8:
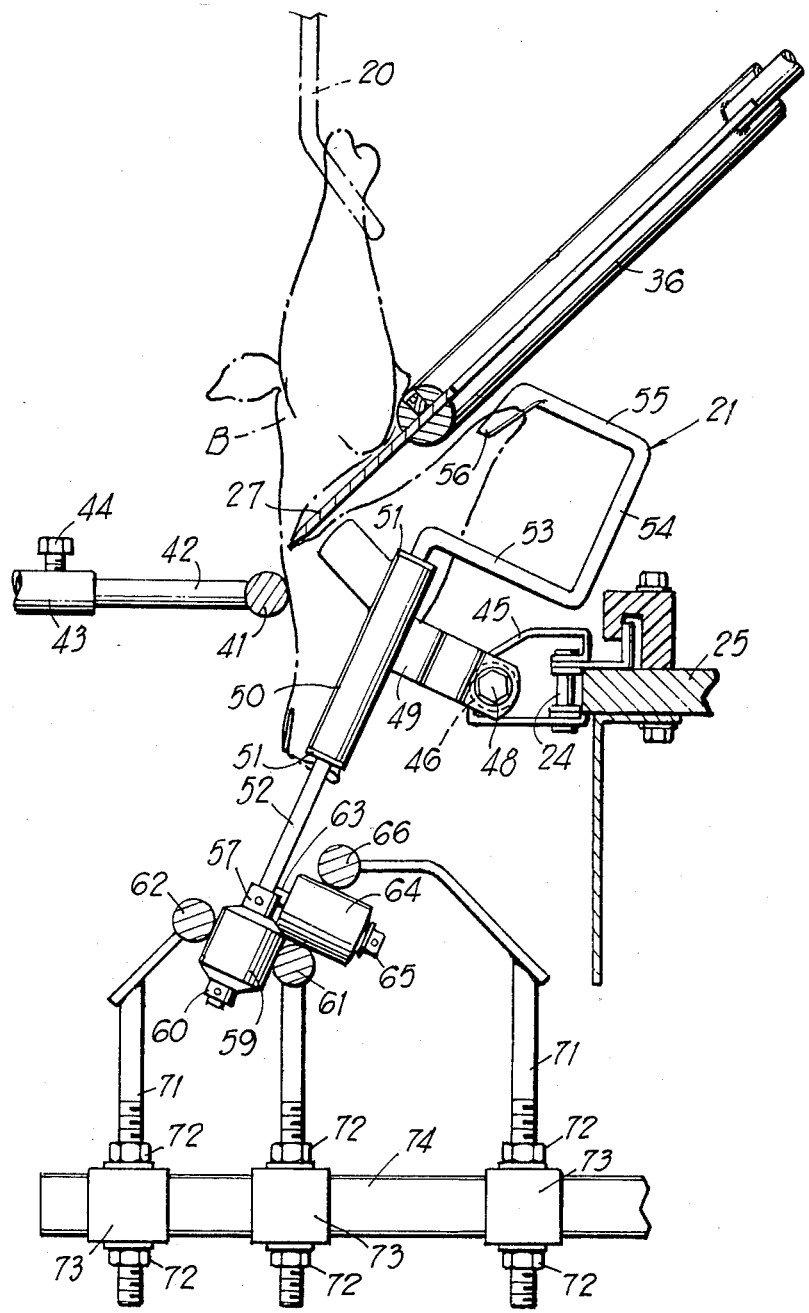
FIG. 8 is a similar view depicting the severing or halving of the bird by a relatively stationary severing blade while the moving bird continues to be held by the orientation device.

At location 70, FIG. 1, the rods 61, 62 and 66 are shaped to cause each device 21 to pivot further inwardly to the inclined bird stretching position of FIG. 7 which is the final position of each bird as it is carried across the severing blade 27 to be cleanly halved by such blade, as shown in FIG. 8. The entire breast, wing and neck portion of the bird is separated from the lower back and legs, as shown. As the bird is thus halved, the tension of the flesh on the tang 56 is released, and the device 21 can make its return along the rear side of the machine where it is again positioned by the camming rods at location 67, FIG. 4, to accept and engage another bird coming into the machine.

The three camming rods 61, 62 and 66 are rendered adjustable vertically through screw-threaded rods 71 attached thereto carrying locking nuts 72. The camming rods are adjusted horizontally through sliding sleeves 73 on transverse arms 74 which are fixed to the frame of the machine. The arrangement is such that tightening of the nuts 72 not only locks the vertical rods 71 but also locks the sleeves 73 on the arms 74.

One further feature of the machine should be mentioned, namely, the provision of a pair of threaded adjusting rods 75 above and parallel to the arms 30 and being attached at their forward ends to the tubes 34. The arrangement provides for finely adjusting the tubes 34 and shafts 35 by swinging them around the axes of the bolts 33 which connect the yokes 32 to the arms 30.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A machine for severing birds across the backbone between the breast and hind quarters comprising an overhead shackle line by means of which birds in succession hanging by their hocks are conveyed substantially horizontally through a severing zone, an endless substantially horizontal conveyor for bird orientation and positioning device below said overhead shackle line and moving in timed relation to the shackle line through said severing zone, plural spaced bird orientation and positioning devices attached to and traveling with said endless conveyor and each having a pivotal connection with the endless conveyor for swinging movement in a vertical plane relative to the endless conveyor, three endless cam tracks disposed below the endless conveyor and extending in generally parallel relationship to the endless conveyor, each bird orientation and positioning device including a reciprocatory member terminating at its top in a bird body cavity engaging and stretching element, three follower elements on the lower end portion of said reciprocatory member and engaging the three cam tracks in such a manner that during passage of each bird and each bird orientation and positioning device through the severing zone the engaging and stretching element swings to a position over the bird cavity, descends into the cavity and then swings in a direction to stretch the breast portion of each bird across the cavity and away from the bird's suspended hocks, and an elongated longitudinally downwardly inclined relatively stationary severing blade held at the severing zone below the overhead shackle line and somewhat above said endless substantially horizontal conveyor and being inclined across the movement path of the endless conveyor and having a bottom cutting edge adapted to sever each bird cleanly into two sections during its passage through the severing zone.

2. A machine for severing birds as defined in claim 1, and said three follower elements comprising a pair of follower rollers on each bird orientation and positioning device reciprocatory member engaging two of said cam tracks, and a third follower roller on the reciprocatory member at right angles to said pair and engaging two of said cam tracks including one cam track which is engaged by said pair of follower rollers.

3. A machine for severing birds as defined in claim 2, and each orientation and positioning device including a guide tube for said reciprocatory member, and said tube having an arm pivotally connected with the endless substantially horizontal conveyor.

4. A machine for severing birds as defined in claim 1, and a substantially horizontal fixed bird stabilizing bar at and along the severing zone above said three cam tracks and near the elevation of said substantially horizontal conveyor and being slidably engaged by the back of each bird traveling through the severing zone.

5. A machine for severing birds as defined in claim 4, and means to adjust each of said three cam tracks vertically and independently one relative to the other at least at the severing zone.

6. A machine for severing birds across the backbone between the breast and hind quarters to halve the birds comprising an overhead shackle line by means of which birds in succession are hung by their hocks and conveyed substantially horizontally through a severing zone, a substantially horizontal conveyor below the elevation of the shackle line and moving in timed relationship therewith through the severing zone, spaced bird orientation and positioning devices pivotally attached to and traveling with said conveyor and each having a reciprocating bird cavity engaging and stretching hook-like element at its top and somewhat above the elevation of said conveyor, substantially horizontal cam track means disposed somewhat below the elevation of said conveyor and extending along the severing zone, cam follower means on each bird orientation and positioning device engaging and following the cam track means at the severing zone and being operable to swing each orientation and positioning device vertically in opposite directions substantially across the path of movement of said conveyor and to raise and lower said hook-like element on a linear reciprocation path across the pivot axis of the orientation and positioning device, and a single elongated longitudinally inclined severing blade held at the severing zone and extending longitudinally through said zone and being inclined with its leading end at a lower elevation than its trailing end at the severing zone and having a bottom cutting edge along its length.

* * * * *